US006961932B2

(12) United States Patent
Mishra et al.

(10) Patent No.: US 6,961,932 B2
(45) Date of Patent: Nov. 1, 2005

(54) SEMANTICS MAPPING BETWEEN DIFFERENT OBJECT HIERARCHIES

(75) Inventors: Debi Mishra, Redmond, WA (US); Nikhil Jain, New Delhi (IN); Sushil Baid, Kolkata (IN); Sadagopan Rajaram, Secunderabad (IN); Ramesha Chandrasekhar, Hyderabad (IN); Raja Krishnaswamy, Bellevue, WA (US); Dennis Angeline, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 766 days.

(21) Appl. No.: 09/931,649

(22) Filed: Aug. 15, 2001

(65) Prior Publication Data

US 2003/0101438 A1 May 29, 2003

(51) Int. Cl.[7] .............................................. G06F 9/45
(52) U.S. Cl. ..................................................... 717/186
(58) Field of Search ......................................... 717/136

(56) References Cited

U.S. PATENT DOCUMENTS

| | | | | |
|---|---|---|---|---|
| 5,845,119 A | * | 12/1998 | Kozuka et al. | 717/107 |
| 5,937,189 A | * | 8/1999 | Branson et al. | 717/101 |
| 6,002,874 A | * | 12/1999 | Bahrs et al. | 717/157 |
| 6,023,578 A | * | 2/2000 | Birsan et al. | 717/105 |
| 6,066,181 A | | 5/2000 | DeMaster | |
| 6,298,476 B1 | * | 10/2001 | Misheski et al. | 717/101 |
| 6,446,133 B1 | * | 9/2002 | Tan et al. | 709/245 |
| 6,453,356 B1 | * | 9/2002 | Sheard et al. | 709/231 |
| 6,467,079 B1 | * | 10/2002 | Ettritch et al. | 717/108 |
| 6,513,152 B1 | * | 1/2003 | Branson et al. | 717/100 |
| 6,553,405 B1 | | 4/2003 | Desrochers | |
| 6,611,817 B1 | * | 8/2003 | Dorrance et al. | 705/39 |
| 6,622,165 B1 | * | 9/2003 | Philyaw | 709/217 |
| 6,718,364 B2 | | 4/2004 | Connelly et al. | |
| 6,721,942 B1 | * | 4/2004 | Sievert | 717/137 |
| 6,738,968 B1 | * | 5/2004 | Bosworth et al. | 717/157 |
| 6,754,886 B1 | * | 6/2004 | Merk et al. | 717/116 |
| 6,760,913 B1 | * | 7/2004 | Bailey et al. | 719/316 |

OTHER PUBLICATIONS

Flexible Collaboration Transparency: Supporting Worker Independence in Replicated Application–Sharing Systems, James Begole et al., VPI, ACM, Jun. 1999, pp. 95–132.*
Collaboration Transparency in the DISCIPLE Framework, Wen Li et al, ACM, Jan. 1999, pp. 326–335.*
JAVA Based Conservative Distributed Simulation, Alois Ferscha et al, ACM, Dec. 1997, pp. 381–388.*
Programming Languages for Mobile Code, Tommy Thorn, ACM Computing Surveys, vol. 29, No. 3, Sep. 1997, pp. 213–239.*
FlexiNet—A Flexible Component Oriented Middleware System, Richard Hayton et al, ACM, Sep. 1998, pp. 17–24.*
Transparency and Reflections in Distributed Systems, Robert Stroud, ACM, Apr. 1992, pp. 99–103.*
StratOSphere: Mobile Processing of Distributed Objects in JAVA, Daniel Wu et al, ACM, 1998, pp. 121–132.*
The C++ Programming Language, Third Edition, Bjarne Stroustrup, Jul. 7, 1997, pp. 130–131,384–386,496–497, 847,850–851.*

* cited by examiner

*Primary Examiner*—Todd Ingberg
(74) *Attorney, Agent, or Firm*—Lee & Hayes, PLLC

(57) ABSTRACT

To enhance portability of programming languages and compiled codes, methods and/or devices optionally compile a programming language code associated with one framework to a code associated with another framework and/or convert a code associated with one framework to a code associated with another framework. The aforementioned converters and/or methods include, but are not limited to, features for supporting framework differences in object hierarchy, exceptions, type characteristics, reflection transparency, and/or scoping.

31 Claims, 11 Drawing Sheets

US 6,961,932 B2

SEMANTICS MAPPING BETWEEN DIFFERENT OBJECT HIERARCHIES

TECHNICAL FIELD

This invention relates generally to methods and/or devices for enhancing portability of programming language codes and compiled codes.

BACKGROUND

An object-oriented programming language (OOPL) typically defines not only the data type of a data structure, but also the types of functions that can be applied to the data structure. In essence, the data structure becomes an object that includes both data and functions. During execution of an OOPL program, access to an object's functionality occurs by calling its methods and accessing its properties, events, and/or fields.

In an OOPL environment, objects are often divided into classes wherein objects that are an instance of the same class share some common property or properties (e.g., methods and/or instance variables). Relationships between classes form a class hierarchy, also referred to herein as an object hierarchy. Through this hierarchy, objects can inherit characteristics from other classes.

In object-oriented programming, the terms "Virtual Machine" (VM) and "Runtime Engine" (RE) have recently become associated with software that executes code on a processor or a hardware platform. In the description presented herein, the term "RE" includes VM. A RE often forms part of a larger system or framework that allows a programmer to develop an application for a variety of users in a platform independent manner. For a programmer, the application development process usually involves selecting a framework, coding in an OOPL associated with that framework, and compiling the code using framework capabilities. The resulting platform-independent, compiled code is then made available to users, usually as an executable file and typically in a binary format. Upon receipt of an executable file, a user can execute the application on a RE associated with the selected framework.

Traditional frameworks, such as the JAVA™ language framework (Sun Microsystems, Inc., Palo Alto, Calif.), were developed initially for use with a single OOPL (i.e., monolithic at the programming language level); however, a recently developed framework, .NET™ framework (Microsoft Corporation, Redmond, Wash.), allows programmers to code in a variety of OOPLs. This multi-OOPL framework is centered on a single compiled "intermediate" language having a virtual object system (VOS). As a result, the object hierarchy and the nature of the compiled code differ between the JAVA™ language framework and the .NET™ framework.

For the discussion presented herein, the term "bytecode" is generally associated with a first framework and the term "intermediate language code" or "IL code" is associated with a second framework, typically capable of compiling a variety of programming languages. In a typical framework, the framework RE compiles code to platform-specific or "native" machine code. This second compilation produces an executable native machine code. Throughout the following description, a distinction is drawn between the first compilation process (which compiles a programming language code to bytecode or an intermediate language code) and the second compilation process (which compiles, for example, a bytecode or an intermediate language code to native machine code/instructions). In general, a "compiled code" (or "compiled codes") refers to the result of the first compilation process.

To enhance portability of programming languages and compiled codes, there is a need for methods and/or devices that can perform the following acts: (i) compile a programming language code associated with a first framework (e.g., a bytecode framework) to a compiled code associated with a second framework (e.g., an IL code framework); and/or (ii) convert a compiled code associated with a first framework (e.g., a bytecode framework) to a compiled code associated with a second framework (e.g., an IL code framework). Such methods and/or devices should account for differences in object hierarchy and perform without substantially compromising the original programmer's intent.

SUMMARY

To enhance portability of programming languages and compiled codes, methods and/or devices described herein optionally compile a programming language code associated with one framework to a code associated with another framework; and/or convert a code associated with one framework to a code associated with another framework. The aforementioned devices and/or methods include, but are not limited to, features for supporting framework differences in object hierarchy, exceptions, type characteristics, reflection transparency, and scoping. Such methods and/or devices optionally account for differences in object hierarchy and perform without substantially compromising the original programmer's intent.

Additional features and advantages of the invention will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
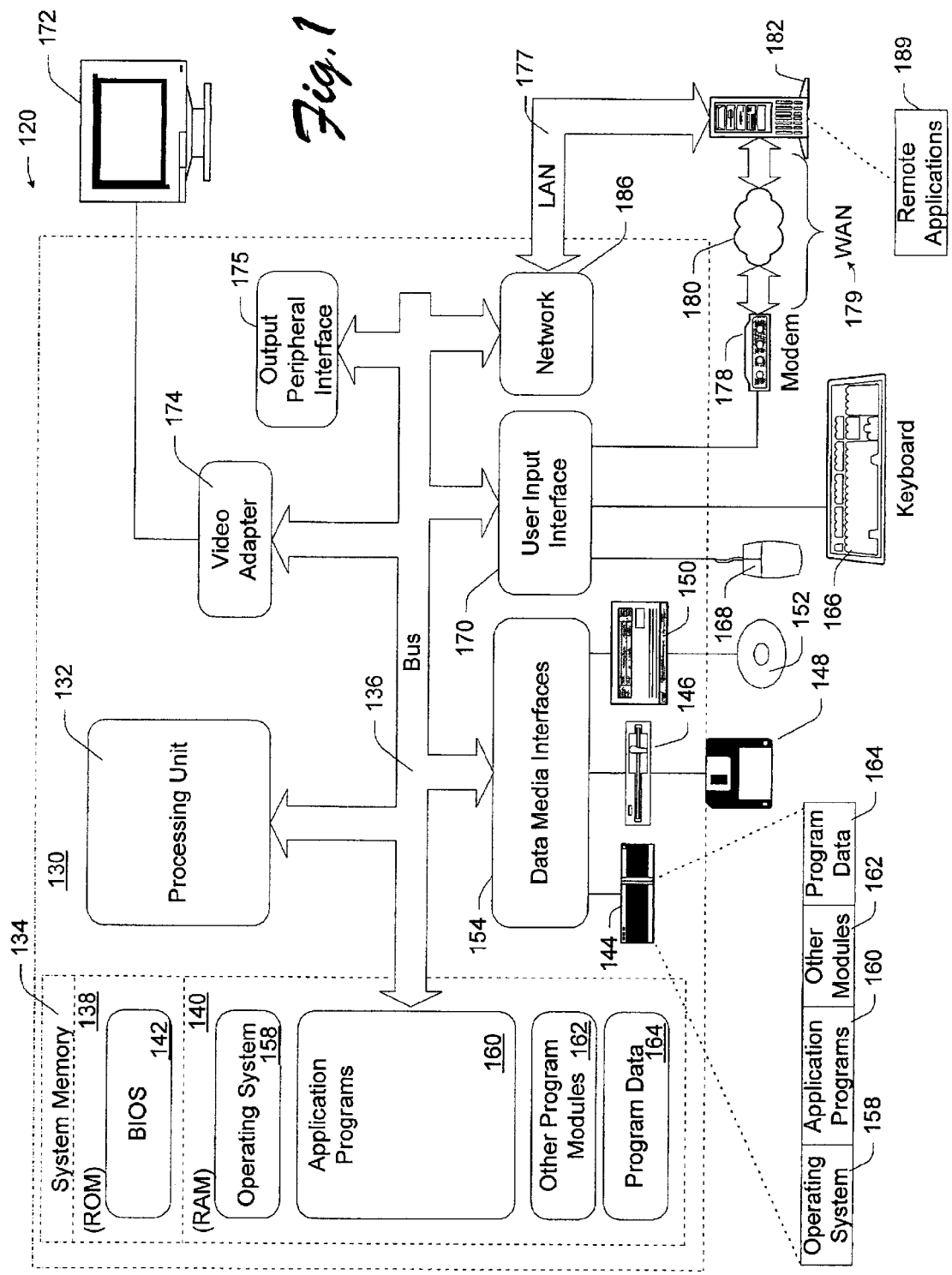
FIG. 1 is a block diagram generally illustrating an exemplary computer system on which the present invention may be implemented.

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and converter arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN)

179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Converters and Conversion Processes

To enhance portability of programming languages and compiled codes, methods and converters are presented herein to perform the following acts: (i) compile a programming language code associated with a first framework (e.g., a bytecode framework) to a compiled code associated with a second framework (e.g., an IL code framework); and/or (ii) convert a compiled code associated with a first framework (e.g., a bytecode framework) to a compiled code associated with a second framework (e.g., an IL code framework). While various examples presented herein include a first framework comprising a bytecode framework and a second framework comprising an IL code framework, the exemplary converters and exemplary methods are not limited to bytecode and IL code frameworks. Further, conversion optionally includes conversions between bytecode frameworks, conversions between IL code frameworks and/or conversions to, from and/or between other types of frameworks known in the art. Additional features are discussed below that help to retain the original programmer's intent.

Figure 2:
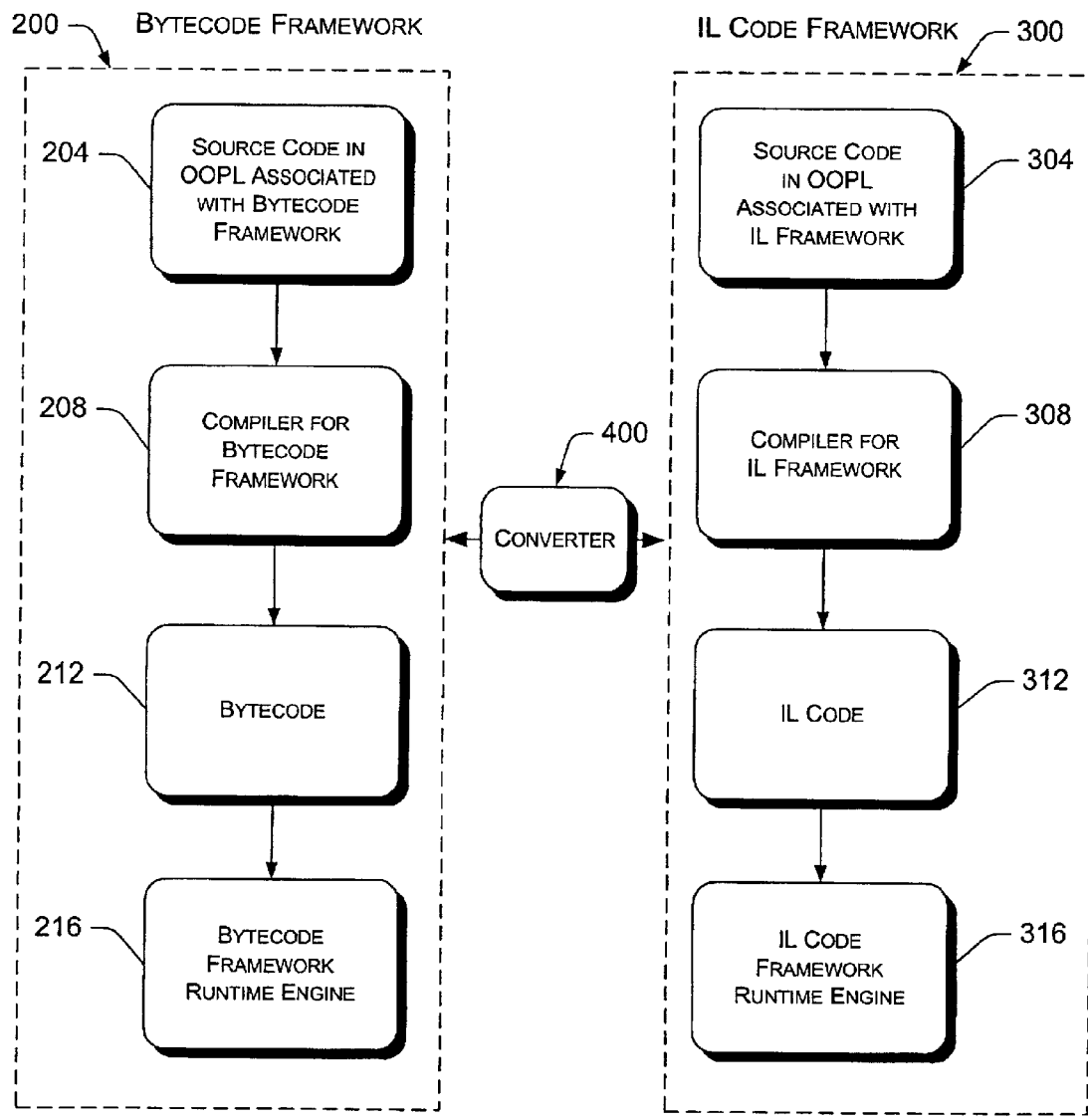
FIG. 2 is a block diagram illustrating two different frameworks as known to one of ordinary skill in the art.

FIG. 2 shows a block diagram of a first framework comprising a bytecode framework 200, a second framework comprising an IL code framework 300 and a converter 400. The bytecode framework 200 includes a source code block 204 for a source code written in an OOPL, such as the JAVA™ programming language (Sun Microsystems, Inc., Palo Alto, Calif.). A compiler block 208 compiles the source code to produce a bytecode, shown in bytecode block 212. Next, a RE block 216 receives bytecode from the bytecode block 212. At run time the RE block 216 interprets and/or compiles and executes native machine code/instructions to implement applications embodied in the bytecode.

The IL code framework 300 includes a source code block 304 for a source code written in an OOPL, such as VISUAL C#™ (Microsoft Corporation, Redmond, Wash.). A compiler block 308 compiles the source code to produce an IL code, shown in IL code block 312. The compiler block 308 optionally has the capability of compiling more than one type of OOPL. The IL code block 312 may also include metadata, which helps the RE manage objects. Next, a RE block 316 receives IL code from the IL code block 312. At run time the RE block 316 compiles and executes native machine code/instructions to implement applications embodied in the IL code.

The converter 400 converts various operations and/or code between one framework and another as desired and/or as required. A variety of exemplary converters are described below.

Figure 3:
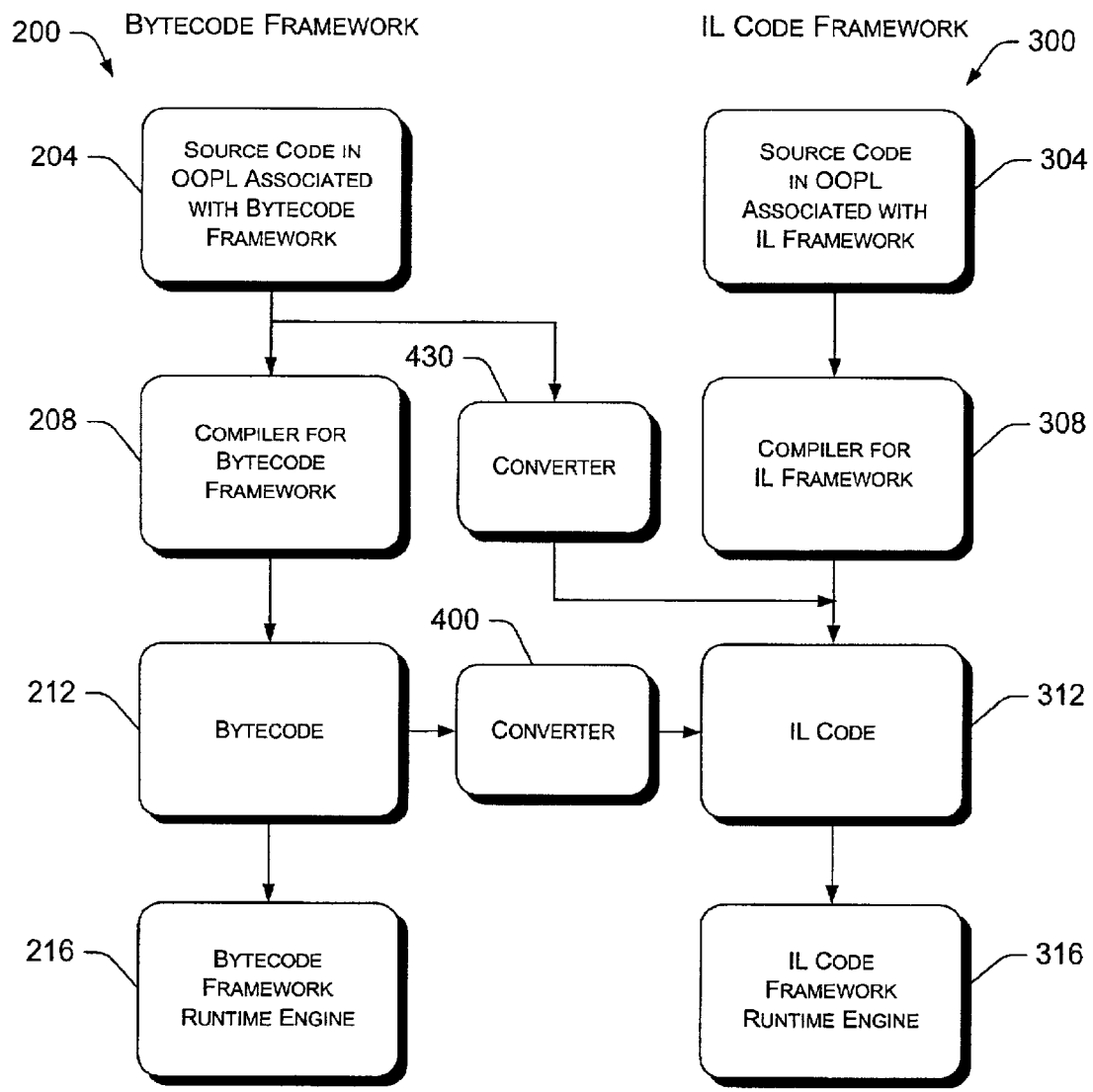
FIG. 3 is a block diagram illustrating two frameworks and an exemplary converter for converting a bytecode to an IL code.

FIG. 3 shows the block diagram of FIG. 2 further including an exemplary converter block 400 that converts bytecode to IL code and another exemplary converter block 430 that converts an OOPL code to an IL code. While the description below focuses primarily on the bytecode to IL code converter block 400, the OOPL code to IL code converter 430 addresses similar issues.

Figure 4:
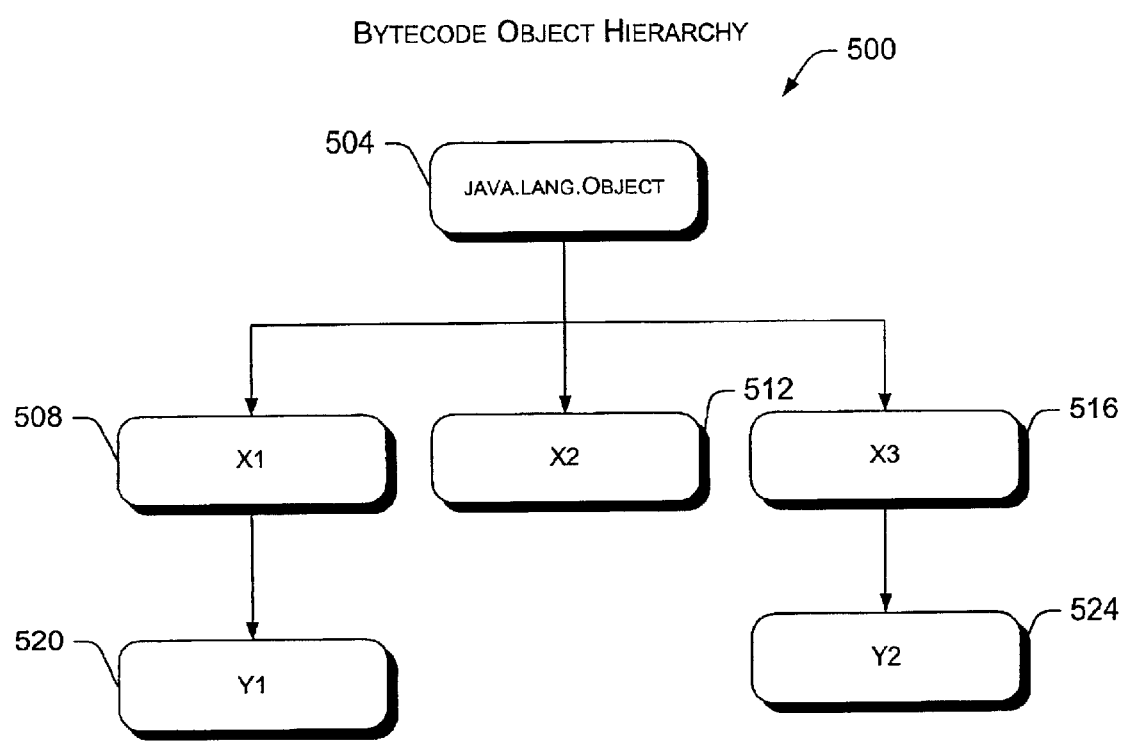
FIG. 4 is a block diagram illustrating an object hierarchy for a framework using bytecode.

The converter 400 accounts for a variety of issues including differences in object hierarchies. As a specific example, consider the object hierarchy of the OOPL-based JAVA™ language framework. In the JAVA™ language framework, a class known as the "Object" class sits at the base of the class hierarchy, this Object class appears herein as java.lang.Object. Referring to the object hierarchy 500 shown in FIG. 4, the java.lang.Object class 504 appears at the base of the hierarchy 500. The java.lang.Object class 504 defines the basic state and behavior of all objects. All other classes descend either directly or indirectly from the Object class 504. As shown in FIG. 4, class X1 508, class X2 512 and class X3 516 are subclasses of the java.lang.Object class 504, which is a superclass of these subclasses. A subclass inherits state and behavior in the form of variables and methods from its superclass. Subclasses Y1 520 and Y2 524 inherit from classes X1 508 and X3 516, respectively, as well as from java.lang.Object class 504.

Supporting an Object Hierarchy

Figure 5:
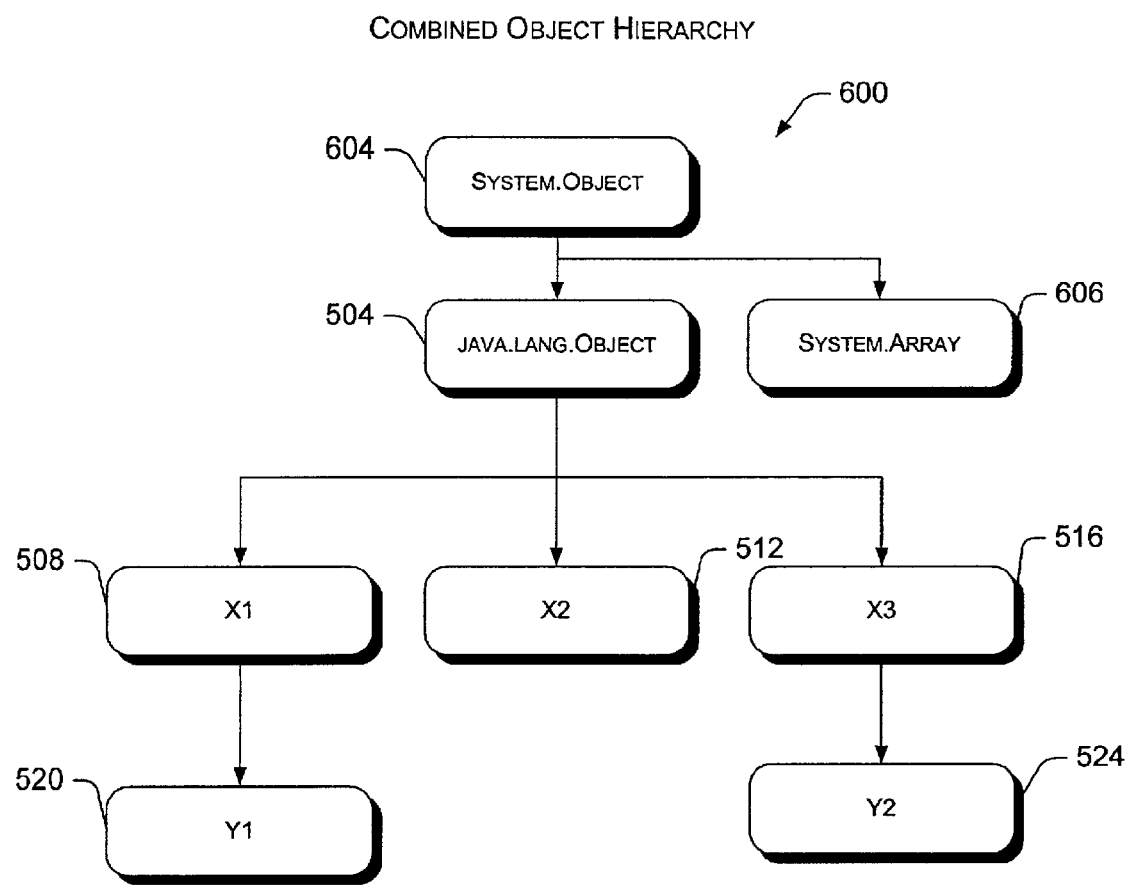
FIG. 5 is a block diagram illustrating an exemplary combined object hierarchy.

To adequately convert bytecode of the JAVA™ language framework to IL code of the .NET™ framework, the converter should ensure that the object hierarchy of the JAVA™ language framework inherits from a class within the .NET™ object hierarchy. In the .NET™ framework, the base class is the System.Object class. FIG. 5 shows a combined object hierarchy 600 wherein a java.lang.Object class 504 and related subclasses (508, 512, 516, 520, 524) inherit from a .NET™ System.Object class 604.

The combined object hierarchy 600, as shown in FIG. 5, however, may not adequately account for differences in arrays. In the JAVA™ language framework, arrays are objects and inherit from java.lang.Object 504 directly. Thus, assuming that class X2 512 is an array creation class called java.array, this class should inherit from java.lang.Object 504 and System.Object 604. However, the IL code of the .NET™ framework supports creation of arrays only as instances of an array class, known as System.Array 606, note that java.lang.Object 504 does not inherit from System.Array 606. Thus, whenever a method call tries to treat an array as a java.langObject, it would fail. For example, consider the following JAVA™ language code:

new int[2].objectMethod( );

This code will fail because the object created by "new int[2]" is not an instance of java.lang.Object, i.e., any attempt to call the method objectMethod( ) of java.lang.Object will fail. Therefore, to adequately account for a JAVA™ language framework array, the java.array class that inherits from System.Array 606 should also inherit from java.lang.Object 504.

An additional aspect of the array issue involves type checking of array assignments. For example, consider the following code for executing an assignment:

Object[ ] obj={new int[2], "nikhil"};

This code tries to assign an array to an element of java.lang.Object[ ]; however, the array is not an instance of java.lang.Object. Strict type checking at runtime for array element assignments in .NET™ framework ensures that an exception (e.g., ArrayTypeMismatchException) gets thrown at runtime.

Figure 6:
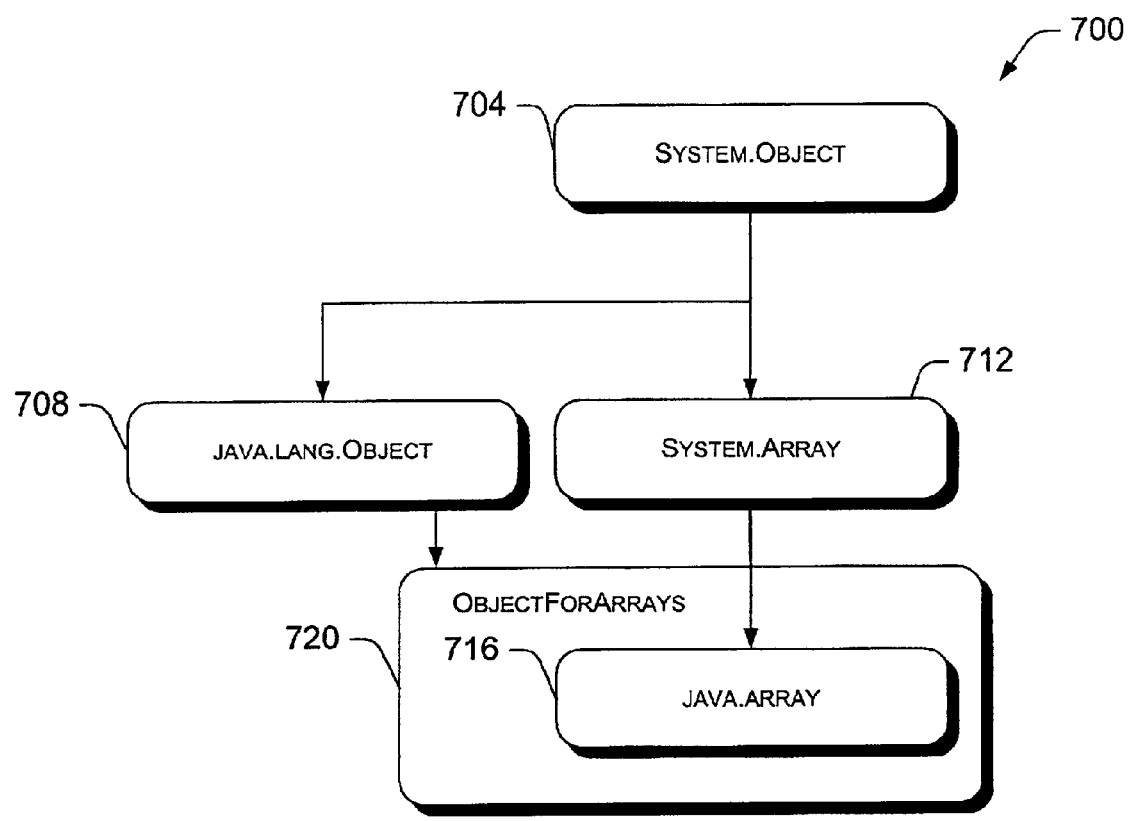
FIG. 6 is a block diagram illustrating an exemplary combined object hierarchy including an ObjectForArrays class.

An exemplary procedure for handling these java.array inheritance issues involves the creation of a new class, referred to herein as ObjectForArrays. Referring to FIG. 6, a combined object hierarchy 700 is shown including ObjectForArrays 720. In this object hierarchy 700, ObjectForArrays 720 inherits from java.lang.Object 708 and java.array 716 inherits through System.Array 712 and both java.lang.Object 708 and System.Array 712 inherit through System.Object 704. In an exemplary method, the ObjectForArray class 720 is used whenever an attempt is made to use an array like an object. The methods of the ObjectForArray class 720 are static and take an extra parameter that is the object on which the java.lang.Object method call is intended. The difference though, is that this parameter is a System.Object 704 rather than ajava.lang.Object 708. Hence, this object hierarchy 700 can handle arrays.

The following exemplary code illustrates aspects of the object hierarchy 700 shown in FIG. 6.

```
java.lang.Object
public void objectMethod ( )
{
    implementation
}
        |
        ↓
ObjectForArrays
public static objectMethod (System.object o)
{
    implementation with "o" in place of "this"
}
```

Whenever an array is treated like a java.lang.Object, a converter converts the code. For example, consider the following converter operation:

```
Code Before Compilation          Implied Code After Conversion
int [ ] i = new int [2];    →    int [ ] i = new int [2];
i.objectMethod ( );              ObjectForArrays.objectMethod (i);
```

In the instance where a java.lang.Object method is called on an object whose type is not known at compilation time, a converter converts the corresponding code in the following exemplary manner:

```
public void m(Object obj)
{
    obj.objectMethod( );
}
        |
        ↓
public void m(Object obj)
{   if (obj instanceof System.Array)
        ObjectForArrays.objectMethod (obj);
    else
        obj.objectMethod( );
}
```

Referring again to FIG. 3, as described above, an exemplary converter 400 converts code from one framework, e.g., the JAVA™ language framework, to an executable code in another framework, e.g., the .NET™ framework. The converter 400 handles framework array element assignment issues by ensuring an inheritance check of the object being assigned inheriting from the type of the runtime array passes. For example, referring to the combined object hierarchy 600 of FIG. 5, whenever a need exists for java.lang.Object 504 array creation, the exemplary converter 400 creates System.Object 604 arrays. In the conversion process, the converter 400 does not change the signature of the field or the local variable; only the actual object created gets changed.

```
java.lang.Object[] obj = new java.lang.Object[2];
obj[0] = new int[2];
        |
        ↓
java.lang.Object[] obj = new System.Object[2];
obj[0] = new int[2];
```

According to this exemplary converter 400 and conversion process, the underlying System.Object[ ] behaves seamlessly like a java.lang.Object[ ]. Note that the brackets "[ ]" represent an operator or action such as declaration of an array, creation of an array, and access of array elements. In a further aspect of this exemplary converter 400, whenever a user attempts to reflect upon the type of the object by using getClass( ) method in java.lang.Object 504 on the object, the getClass code returns the type as java.lang.Object[ ] and not System.Object[ ].

In yet another aspect, the exemplary converter 400 handles arrays created through a reflection API. In the JAVA™ language framework, a reflection API (e.g., available through the command "import java.lang.reflect.*") can generally be used to determine the class of an object; to get information about a class's modifiers, fields, methods, constructors, and superclasses; to find out what constants and method declarations belong to an interface; to create an instance of a class whose name is not known until runtime; to get and set the value of an object's field, even if the field name is unknown to your program until runtime; to invoke a method on an object, even if the method is not known until runtime; and to create a new array, whose size and component type are not known until runtime, and then modify the array's components.

According to the exemplary converter 400, when a code calls for creation of a java.lang.Object[ ] array using the reflection API (e.g., using Array.newInstance), the converter 400 creates a corresponding System.Object[ ]. The exemplary converter 400 further accounts for verification issues upon assignment of a System.Object[ ] to a field of type java.lang.Object [ ].

Another aspect of the exemplary converter 400 handles code containing "instanceof" checks on an array. An object is considered to be an instance of a class if that object directly or indirectly descends from that class. In the JAVA™ language framework, "instanceof" determines whether a first operand is an instance of a second operand wherein, for example, the first operand is the name of an object and the second operand is the name of a class. To ensure that "instanceof" calls on arrays succeed for java.lang.Object, java.lang.Cloneable and java.io.Serializable, the exemplary converter 400 includes the following operation (shown for java.lang.Cloneable):

```
Boolean b = obj instanceof java.lang.Cloneable;
```

```
Boolean b = obj instanceof java.lang.Cloneable ||
           obj instance of System.Array;
```

Regarding the clone method, in the JAVA™ language framework, implementation of this method checks to see if the object on which clone was invoked implements the Cloneable interface, and throws a CloneNotSupportedException if it does not. In particular, note that Object itself does not implement Cloneable, so subclasses of Object that do not explicitly implement the interface are not cloneable. Thus, the exemplary converter 400 accounts for this characteristic of the JAVA™ language framework. In a similar vein, in the JAVA™ language framework, an object is serializable only if its class implements the Serializable interface. Thus, code that seeks to serialize instances of a class requires that the class implement the Serializable interface. Again, the exemplary converter 400 accounts for this characteristic of the JAVA™ language framework.

```
Boolean b = obj instanceof java.lang.Serializable;
```

```
Boolean b = obj instanceof java.lang.Serializable ||
           obj instance of System.Array;
```

Figure 7:
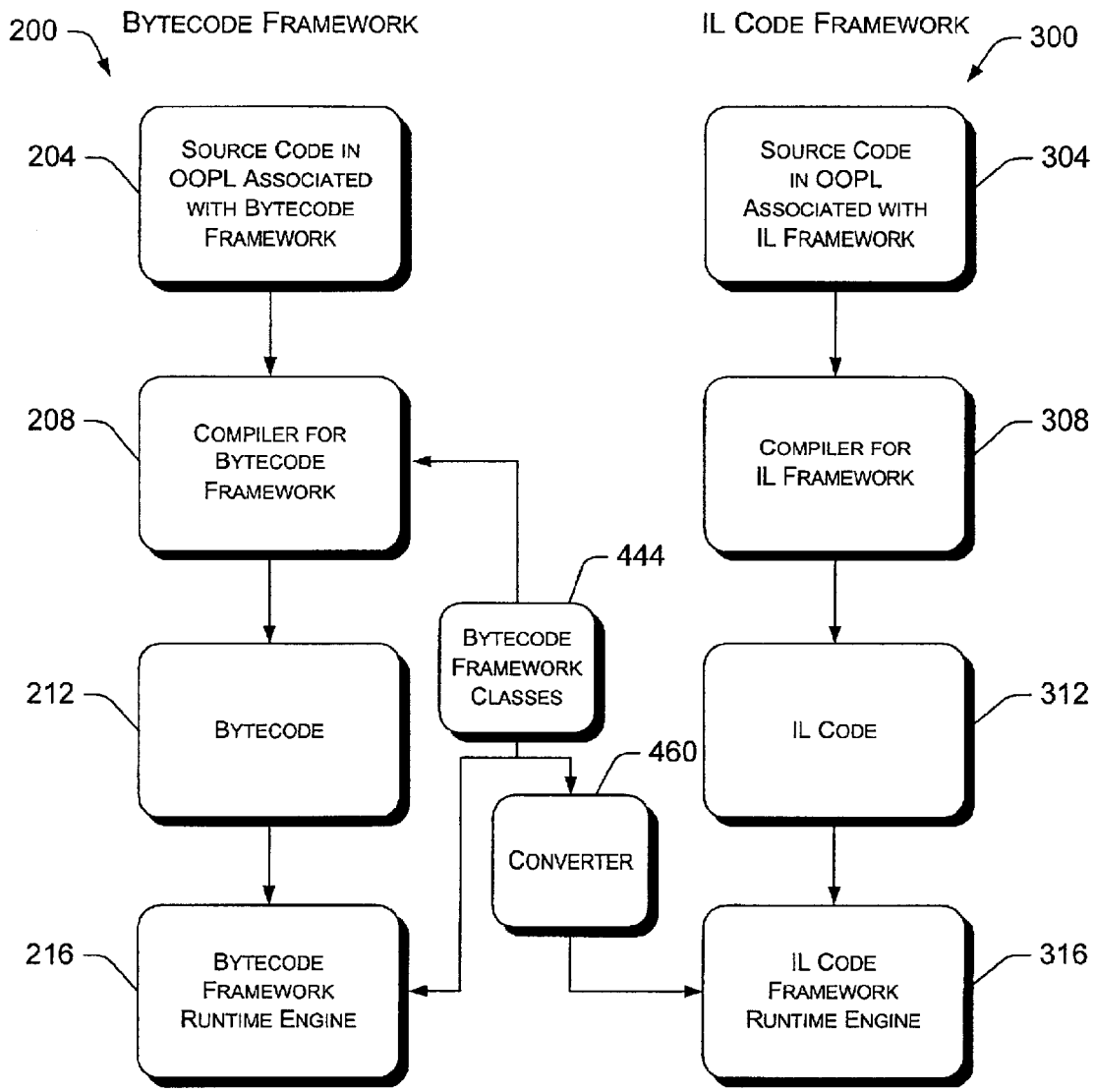
FIG. 7 is a block diagram illustrating two frameworks and an exemplary converter for converting classes.

JAVA™ language framework like most OOPLs has a set of class libraries that are used by programmers as a foundation to build applications. Supporting compilation and execution of such applications optionally requires implementation of these class libraries on the .NET™ framework. FIG. 7 shows a block diagram illustrating two frameworks 200, 300 and an exemplary converter 460 for converting classes 444. Accordingly, the exemplary converter 460 optionally allows for implementation of reflection in a first framework 200 (e.g., JAVA™ language framework) on top of reflection in a second framework 300 (e.g., .NET™ framework). Such an exemplary converter 460 converts classes written in source code (e.g., an OOPL code) and/or classes that exist in a compiled code (e.g., bytecode or other compiled code) (see, e.g., FIGS. 2 and 3, the converter 400 and the converter 430). While FIG. 7 refers to bytecode framework classes 444, which are available to the bytecode framework RE 216 and/or the compiler for the bytecode framework 208, the classes are optionally classes associated with yet another framework. A class converted by such a converter and associated with a second framework is optionally referred to herein as a first framework class, a converted class, and/or a new class.

In the .NET™ framework, System.Type is the root object of .NET™ framework reflection mechanism, wherein a type object describes a class. Thus, for example, a reflection to get information about a class's modifiers, fields, methods, constructors, and superclasses uses the underlying System.Type object. For arrays, the type object for arrays is the type object for the .NET™ framework arrays, which are an instance of System.Array. The class library implementation accounts for this difference because reflection on a .NET™ framework array gives different results than an ordinary reflection on a JAVA™ framework array. An exemplary method for class library implementation handles this particular issue in a way that maintains the original programmer's intent.

In yet another aspect, an exemplary converter optionally accounts for verification issues related to difference between frameworks. For example, a verification issue arises upon assignment of an array to fields of types java.lang.Object. Similarly, a verification issue arises for creation of System.Object arrays in place of java.lang.Object arrays when assigning a field of type java.lang.Object ("JLO") to one of the System.Object ("SO") arrays. The exemplary converter 400 handles these issues by isolating them into a file having static methods. For example, a file named VerifierFix has static methods by the name getJLOFromSO that take SO or SO[ ] . . . [ ] as a parameter and return JLO or JLO[ ] . . . [ ] correspondingly. This process results in isolation of all verification issues into one class VerifierFix and hence all other binaries generated by the compiler would not hit any of these verification issues. The following operation demonstrates a process for handling verification issues.

```
java.lang.Object obj = new obj[2];
java.lang.Object[] obj1 = new java lang.Object[2]
```

```
java.lang.Object obj =
        VerifierFixgetJLOFromSO(new int[2]);
java.lang.Object[] obj1 =
        VerifierFix.getJLOFromSO(new System.Object[2]);
```

Note that the above call to VerifierFix.getJLOFromSO calls different overloaded methods in the two cases shown above. The first one takes an SO and returns a JLO and the second one takes a SO[ ] and returns a JLO[ ].

As already mentioned, a reflection can also be used to set the value of an object's field. Such reflection operations may differ from one framework to another. Thus, the exemplary converter 400 optionally accounts for such differences. For example, when code from a JAVA™ language framework executes on a .NET™ runtime, any attempt to set an array to a field type of java.lang.Object will fail. The failure is due to the fact that arrays in the .NET™ framework do not normally inherit from java.lang.Object. Consequently, the .NET™ reflection API causes an exception. As a remedy, the exemplary converter 400 emits a private method that takes a System.Object as an argument and within the method assigns this argument to the field. Thus, when a reflection call to assign a value to such a field appears, the converter 400 provides for the aforementioned private method. The framework invokes the private method using reflection and hence bypasses the reflection check for the type of value to be assigned.

At the code level, the converter's remedy optionally appears as follows:

```
class A
{
        java.lang.Object f;
        java lang.Object[ ] fl;
}
```

-continued
```
class A
{
    java.lang.Object f;
    java lang.Object[ ] fl;
    private $setf (System.Object value) {
        f = VerifierFix.getJLOFromSO(value);
    } private $setfl (System.Object[ ] value) {
        fl = VerifierFix.getJLOFromSO(value);
    }
}
```

This exemplary converter code averts the throwing of an exception by a reflection API by calling the $setf method and assigning the value, which could be an array, to the field f. Note that this remedy does not impact normal use of arrays, like array assignments.

In essence, the exemplary converter introduces an instanceof check when arrays are used as java.lang.Object by calling a method in java.lang.Object class on this array object. Further, all calls to methods of java.lang.Object where the underlying object is not an array result in a method call and an instanceof check. Overall, the remedy for each verification issue requires a method call. The slight increase in overhead however does not detract from the goal of successfully converting code from one framework to another while retaining the programmer's original intent.

Supporting Framework Exceptions

The exemplary converter 400, described herein (see, e.g., "Supporting a Framework Object Hierarchy"), optionally includes features that support exceptions from one framework on another framework. For example, consider the JAVA™ language exception hierarchy 800 shown in FIG. 8. JAVA™ language public class Object 804 sits at the base of the JAVA™ language framework's hierarchy 800 such that every class has Object 804 as a superclass. As described previously, all objects, including arrays, inherit the methods of the java.lang.Object class 804.

In the exception hierarchy 800, the class java.lang.Throwable 808 sits below java.lang.Object 804. The Throwable class 808 is the superclass of all errors and exceptions in the JAVA™ language framework. Only objects that are instances of this class (or of one of its subclasses) are thrown by the JAVA™ language RE or can be thrown by a "throw" statement. Similarly, only this class or one of its subclasses can be the argument type in a catch clause. In the JAVA™ language framework, the Throwable class 808 also contains a snapshot of the execution stack of its thread at the time it was created.

Figure 8:
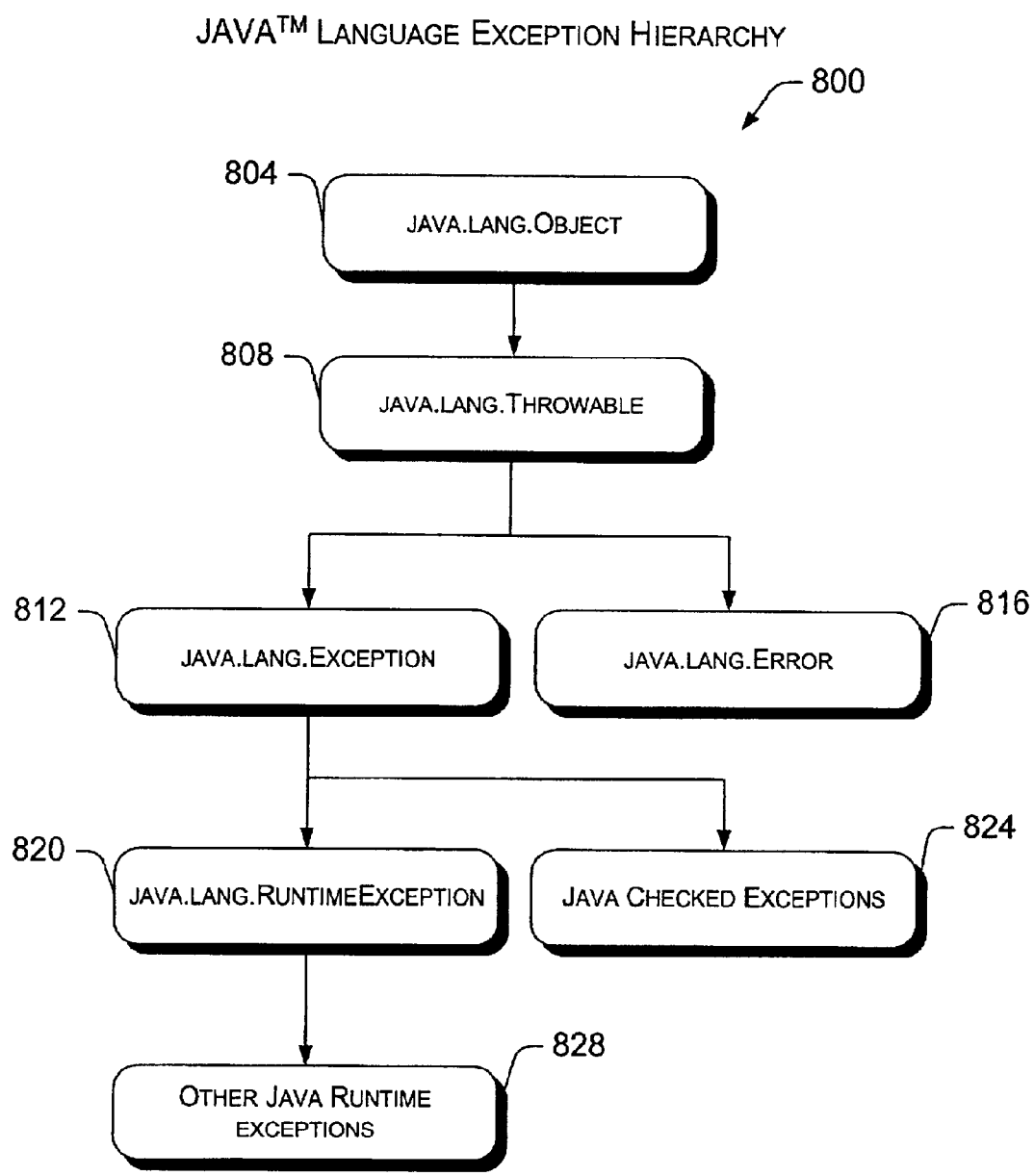
FIG. 8 is a block diagram illustrating the JAVA™ language framework's exception hierarchy.

As mentioned, the Throwable class 808 is the superclass of all errors and exceptions in the JAVA™ language framework. Thus, the classes java.lang.Exception 812 and java.lang.Error 816 sit below java.lang.Throwable 808 in the hierarchy 800. In general, the class java.lang.Exception 812 and its subclasses, java.lang.RuntimeException 820 (unchecked exceptions) and Java Checked Exceptions 824, are forms of Throwable 808 that indicate conditions that a reasonable application might want to catch. Also shown in FIG. 8 is a subclass of java.lang.RuntimeException 820 entitled "Other Java Runtime Exceptions" 828, which simply recognizes the possibility of other runtime exceptions. The java.lang.Error 816 class is a subclass of Throwable 808. The Error class 816 indicates serious problems (e.g., abnormal conditions) that a reasonable application should not try to catch.

A list of exceptions and/or errors thrown by the JAVA™ language RE appears below.

java.lang.ArithmeticException
java.lang.ArrayIndexOutOfBoundsException
java.lang.ArrayStoreException
java.lang.ClassCastException
java.lang.Error
java.lang.Exception
java.lang.IllegalAccessError
java.lang.IllegalArgumentException
java.lang.IllegalMonitorStateException
java.lang.IllegalThreadStateException
java.lang.IncompatibleClassChangeError
java.lang.IndexOutOfBoundsException
java.lang.InternalError
java.lang.InterruptedException
java.lang.LinkageError
java.lang.NoClassDefFoundError
java.lang.NoSuchFieldError
java.lang.NoSuchMethodError
java.lang.NullPointerException
java.lang.NumberFormatException
java.lang.OutOfMemoryError
java.lang.RuntimeException
java.lang.SecurityException
java.lang.StackOverflowError
java.lang.ThreadDeath
java.lang.Throwable
java.lang.UnsatisfiedLinkError
java.lang.VerifyError
java.lang.VirtualMachineError Exception handling in the .NET™ framework involves definition of exception blocks. At the IL level, exception block definition occurs predominantly through use of either catch types or filter blocks. For example, catch type exception handling may include a BeginExceptionBlock( ) followed by emission of some IL code; a BeginCatchBlock (ExceptionType) followed by emission of some IL code; and an EndExceptionBlock. Filter block definition handling may include a BeginExceptionBlock( ) followed by emission of some IL code; a BeginFilterBlock( ) followed by emission of some IL code; a BeginCatchBlock(null) followed by emission of some IL code; and an EndExceptionBlock.

When defining catch type exception blocks through the .NET™ Framework's Reflection APIs, ExceptionType must be an instance of the .NET™ framework's System.Exception class; however, at the IL level there is no such limitation. Thus, whenever an exception gets thrown, control goes to the entered catch block if the exception thrown is an instance of ExceptionType.

In contrast, when an exception is thrown according to a filter block exception block, control goes to the .NET™ framework's ExceptionFilterBlock class. According to this scenario, the thrown exception is placed on top of the stack wherein the filter block is used to indicate, for example, a 0 or 1. If the filter block indicates 1, when the filter block ends, the .NET™ framework enters a catch block. If the filter block indicates 0, then the exception goes uncaught by this particular exception block. Hence, in this manner, the filter block filters exceptions by either allowing them to go uncaught or directing them to a catch block.

To handle JAVA™ language framework exceptions on the .NET™ framework, a converter should account for several issues. For example, in the JAVA™ language framework, Errors (instance of java.lang.Error 816) and runtime exceptions (instance of java.lang.RuntimeException 820) can be thrown by the JAVA™ language RE. When a program executes on the .NET™ RE, the exceptions thrown by the runtime are different from those thrown by JAVA™ language RE. The following code illustrates such an instance wherein the .NET™ framework would fail to catch the exception thrown.

```
try {
    int k = 0;
    int j = 5/k;    //causes a runtime exception
} catch (Exception e) {
}
```

Without an exception conversion (e.g., code conversion or mapping), the exception thrown for the above code will not be an instance of java.lang.Exception 812 and hence it will not be caught. Further, a complete one-to-one mapping does not exist for many frameworks. For example, a complete one-to-one mapping does not exist between JAVA™ language exceptions and .NET™ exceptions. Thus, an exemplary converter for handling exceptions accounts for differences in exception class hierarchy and for the lack of a complete one-to-one mapping.

An exemplary converter converts and/or maps JAVA™ language framework exceptions to existing and/or new .NET™ framework exceptions. According to this exemplary converter, catch types are used to catch various JAVA™ language exceptions. For checked exceptions (exceptions not normally thrown by either the JAVA™ language or .NET™ RE), the catch type approach suffices; however, for runtime exceptions and errors the exemplary converter implements filter blocks.

Given a JAVA™ language framework exception throwable by the JAVA™ language RE, the exemplary converter needs to find a corresponding .NET™ framework exception throwable by the .NET™ RE. The exemplary converter should also catch the JAVA™ language exception because, like any checked exception, the associated JAVA™ language code could throw the exception explicitly.

To address this particular issue, the exemplary converter implements filter blocks. During a conversion process, the converter emits IL code for a filter block designed to catch a targeted exception or exceptions. The following code illustrates the conversion process:

```
try {
    Try code { }
} catch (MyException e) {
    catch code { }
}
```

↓

```
try {
    try code { }
} filter(System.Object exc) {
    filter code { }
} catch {
    Thread._getExceptionObject( );
    Catch code { }
}
```

Note that this particular code segment represents code implied by the IL as converted from JAVA™ language code.

The exemplary converter may also implement mapping procedures such as a static mapping from a .NET™ framework exception to a JAVA™ language framework exception, which is used via a method in class java.lang.Throwable. The following code illustrates part of the process:

public static Throwable_mapCorException
        (System.Exception exc)

Assuming a class "A" that is a JAVA™ language framework exception can be thrown by the RE, the class library implementation for this class implements the following method:

```
public static int_exceptFilter(System.Object o) {
    Throwable t = null;
    if (o instanceof A) {
        t = (A)o;
    }else if (o instanceof System.Exception) {
        System.Exception e = (System.Exception)o;
        t = Throwable._mapCorException(e);
        if(t != null) {
            t._updateException(e);
        }
    }
    if(t != null) {
        Thread._setExceptionObject(t);
        return 1;
    }else
        return 0;
}
```

Converter 400 during the conversion process emits the filter code that calls this method, passing the exception object as a parameter. Thus, via this process, the converter implemented filter block allows the .NET™ framework to catch both the .NET™ exception and the JAVA™ language exception.

In the above code, the method "_setExceptionObject( )" is a static method in class java.lang.Thread (a subclass of java.lang.Object) that stores an exception object for loading back on top of the stack upon entry of a catch block. Hence, while emitting IL for a catch block, a preliminary procedure emits IL having the following implied code:

Thread._get ExceptionObject( );

Through this process, the exception object gets loaded on top of the stack, as expected by the code of the catch block.

Following code represents the net implied conversion:

```
try {
    Try code {}
} catch (MyException e) {
    catch code {}
}
```

↓

```
try {
    try code {}
} filter(System.Object exc) {
    Exception._exceptFilter(exc);
} catch {
    Thread._getExceptionObject();
}
```

The conversion process described above assumes that a .NET™ exception corresponds to only one JAVA™ language exception. In instances where one .NET™ exception corresponds to more than one JAVA™ language exception, the exemplary converter implements the following procedure. Consider a case where a .NET™ exception "C" maps to JAVA™ language exceptions "A" and "B". To handle case, the JAVA™ language exception to which the .NET™ exception corresponds, most of the time, (e.g., "A") is marked as corresponding to .NET™ exception "C" in a static table and in a "_exceptFilter( )" for JAVA™ language exception "B", apart from using "_mapCorException( )", the procedure explicitly checks whether the exception thrown is "C", if so, then the procedure returns or indicates 1.

In the case of a thrown .NET™ exception that is an instance of System.SystemException and does not have a JAVA™ language exception equivalent, the thrown .NET™ exception is mapped to a java.lang.RuntimeException. Otherwise the procedure maps the .NET™ exception to null. To the filter block, null indicates avoidance of catch block exception handling, i.e., that the process should not or will not enter a catch block.

The exemplary converter for handling exceptions further allows uncaught exceptions thrown by the .NET™ framework RE to optionally appear to a user, for example, as a corresponding JAVA™ language framework exception.

In the JAVA™ language framework, a thread group represents a set of threads. In addition, a thread group (ThreadGroup) can also include other thread groups. The thread groups form a tree in which every thread group except the initial thread group has a parent. In any particular thread, the JAVA™ language RE calls the method ThreadGroup.uncaughtException when a thread in this thread group stops because of an uncaught exception. The uncaughtException method of ThreadGroup does the following: If this thread group has a parent thread group, the uncaughtException method of that parent is called with the same two arguments (Thread "t" and Throwable "e"). Otherwise, this method determines if the Throwable argument is an instance of ThreadDeath. If so, nothing special is done. Otherwise, the Throwable's printStackTrace method is called to print a stack back trace to the standard error stream. In the JAVA™ language framework, applications can also override this method in subclasses of ThreadGroup to provide alternative handling of uncaught exceptions.

In the .NET™ framework, the exemplary converter optionally instructs for the use of AppDomain.AddOnUnhandledException( ) to register the UnhandledExceptionEventHandler for an AppDomain wherein the handler is optionally created with a delegate method, e.g., "java.lang.Thread._unCaughtException". Accordingly, AddOnUnhandledException calls on the current thread whenever there is an uncaught exception wherein Thread._unCaughtException( ) then calls ThreadGroup.uncaughtException( ). In general, for the .NET™ framework, all user defined exceptions (even if they are runtime exceptions) are treated like checked exceptions because they are not thrown by the .NET™ RE.

The aforementioned exemplary converter allows a code converted from the JAVA™ language framework to the .NET™ framework to handle exceptions essentially as the original programmer intended. To achieve this goal, the exemplary converter approximates the JAVA™ language code as .NET™ IL code; exposes three normally unspecified public methods (Thread._setExceptionObject( ), Thread._getExceptionObject( ) and Throwable._mapCorException( )); and incurs an overhead for execution of filter blocks when an exception gets thrown. However, in this exemplary converter, a few issues may exist. For example, through use of such a converter, the .NET™ framework may not catch a JAVA™ language framework exception by catching System.Exception (base class of all .NET™ exceptions) and the converter may not accurately map the System.StackOverflowException. The former issue impacts the ability of other .NET™ "compatible" languages (e.g., VISUAL C#™ and VISUAL BASICS® execute without conversion) to consume JAVA™ language classes and catch JAVA™ language exceptions while the latter issue stems from a lack of stack space, i.e., when an attempt is made to map the exception thrown because of lack of stack space, the check cannot be performed and System.StackOverflowException gets thrown again. Of course, an exemplary converter and/or method of conversion having additional features may resolve such issues.

The following structures and procedures allow the exemplary converter to overcome the aforementioned System.Exception issue. To catch a JAVA™ language exception from code written in a .NET™ language, the JAVA™ language exceptions must inherit from System.Exception. But java.lang.Throwable (referred as JLT) inherits from JLO in the JAVA™ language framework to allow JLO methods to be called on JAVA™ language exception objects. Without adequate conversion, such a call would fail if JLT does not inherit from JLO. Thus, an exemplary converter implements the hierarchy 900 shown in FIG. 9.

Figure 9:
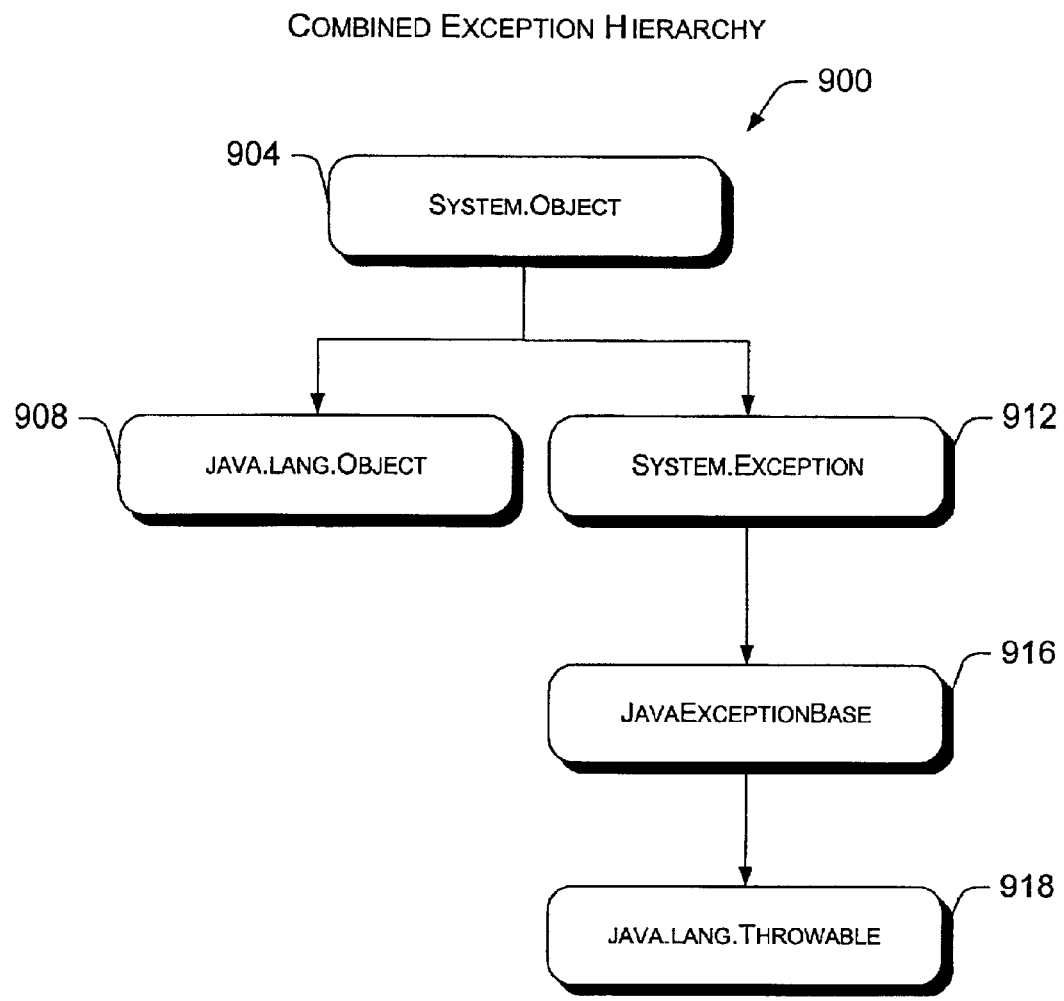
FIG. 9 is a block diagram illustrating an exemplary combined exception hierarchy.

Referring to FIG. 9, a JavaExceptionBase ("JEB") abstract class 916 operates as the base class of all JAVA™ language framework exceptions and inherits from the .NET™ framework System.Exception class 912. According to this hierarchy 900, JavaExceptionBase 916 implements all JLO methods for exception objects.

In the combined exception hierarchy 900, JLT 918 does not inherit from JLO 908, instead, the exemplary converter calls for special handling in the .NET™ framework compiler to allow assignments where a type that derives from JEB 916 is treated as assignable to type JLO. According to this exemplary converter, all method calls to JLO methods on JAVA™ language exception objects now get resolved to corresponding methods in JEB and a stack trace shows JEB in place of JLO. This conversion process also allows for use of JAVA™ language reflection APIs to see what public methods and fields are accessible to a JAVA™ exception object. As a matter of convenience, JAVA™ language reflection APIs implemented on top of .NET™ framework should hide all public System.Exception methods and fields (apart from System.Object methods and fields) and reflection on JLT type for the superclass should return JLO and not JEB.

Regarding instanceof checks, a check on an object being an instance of JLO should return "true" even if the object is a JAVA™ language exception type. The exception handling procedures implemented by the exemplary converter handles this particular issue in a manner similar to that for arrays (described above). Accordingly, the converter generates the following converted code (e.g., from source code to implied code in IL):

Boolean b = obj instanceof java.lang.Object;

↓

Boolean b = obj instanceof java.lang.Object ||
        obj instanceof java.lang.JavaExceptionBase;

The exemplary converter also optionally accounts for verification issues when, for example, a JAVA™ language exception type is assigned to a JLO. Again, in a manner similar to that for arrays, the converter performs the following conversion:

java.lang.Object obj = new Throwable( );

↓

Java.lang.Object obj =
　　VerifierFix.getJLOFromSO(new Throwable( ));

This particular process results in a method call for each verification issue and an additional overhead for instanceof checks involving instanceof JLO. In general, the exemplary converter for handling exceptions catches JAVA™ language framework exceptions as can any other .NET™ language compiler however, the implication of catching a JAVA™ language RE exception differs slightly. For example, if JAVA™ language RE exception "A" maps to .NET™ exception "B", then catching "A" in converted JAVA™ language code using the converter 400 results in catching both "A" and "B" whereas catching "A" in other .NET™ languages results in catching "A".

Figure 10:
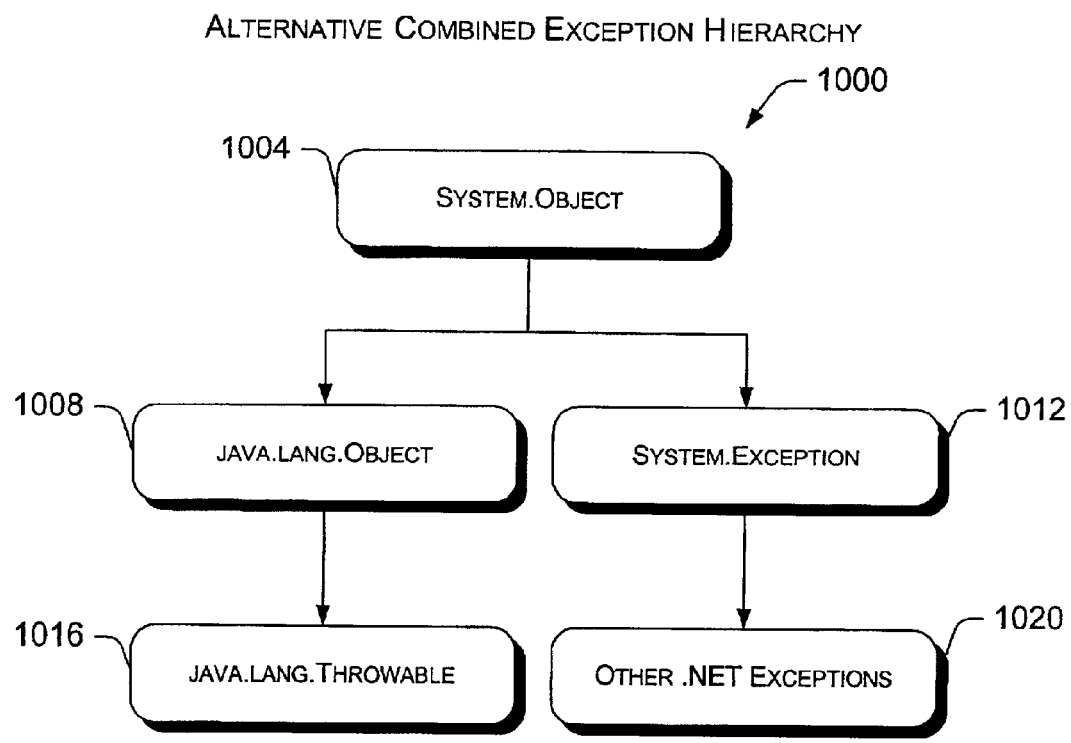
FIG. 10 is a block diagram illustrating an alternative exemplary combined exception hierarchy.

An alternative converter for handling exceptions uses a combined object hierarchy such as the hierarchy 1000 shown in FIG. 10. The use of this particular hierarchy 1000 alleviates the need for special handling in the .NET™ framework complier because JLT 1016 inherits from JLO 1008. However, this exemplary converter may require additional features to catch JAVA™ language exceptions in code written in other languages (e.g., VISUAL C#™ and VISUAL BASIC®).

Converters for handling exceptions that include mapping between .NET™ framework exceptions and JAVA™ language framework exceptions optionally use the mapping table presented below.

Supporting Type Characteristics

Differences in type characteristics may exist between frameworks. For example, the JAVA™ language process for type casting from one primitive type to another differs from that of the .NET™ framework. The JAVA™ language framework normally includes the types "integers" (byte, short, int and long); "real numbers" (float and double); and "other primitive types" (char and Boolean). In particular, differences exist between JAVA™ language and .NET™ frameworks in the following four cases: (i) converting a double to a long; (ii) converting a double to an int; (iii) converting a float to a long; and (iv) converting a float to an int.

In casting between real and integer, if the value of a double/float is more/less than the maximum/minimum value of a long/int, type casting in the .NET™ framework returns a "0" while type casting in the JAVA™ language framework returns the maximum/minimum value. In addition, if the original it value was undefined (e.g., Not-a-Number—"NaN"), the JAVA™ language framework returns "0" while the .NET™ framework exhibits a different behavior.

An exemplary converter for handling type characteristics includes a process wherein that performs the following conversion:

double d = 2.0;　　　　⟶　　　　double d = 2.0;
int i = (double)d;　　　　　　　　int i = Double.__convInt(d);

A static and public method "Double.__convInt( )" converts the aforementioned boundary cases and returns the JAVA™ language framework's expected value. In addition to this method, the exemplary converter also implements the following methods: "public static long Double.__convInt (double d)"; "public static int Float.__convInt(float f)"; and

| .NET ™ Frameworks Exception | JAVA ™ Language Exception |
|---|---|
| System.ArithmeticException | ArithmeticException |
| System.DivideByZeroException | ArithmeticException |
| System.OverflowException | ArithmeticException |
| System.IndexOutOfRangeException | ArrayIndexOutOfBoundsException |
| System.ArrayTypeMismatchException | ArrayStoreException |
| System.InvalidCastException | ClassCastException |
| System.MissingFieldException | NoSuchFieldError |
| System.Reflection.AmbiguousMatchException | NoSuchMethodError |
| System.MissingMethodException | NoSuchMethodError |
| System.MissingMemberException | IncompatibleClassChangeError |
| System.AccessException | IllegalAccessError |
| System.FieldAccessException | IllegalAccessError |
| System.MethodAccessException | IllegalAccessError |
| System.ArgumentException | IllegalArgumentException |
| System.ArgumentNullException | IllegalArgumentException |
| System.ArgumentOutOfRangeException | IllegalArgumentException |
| System.RankException | IllegalArgumentException |
| System.Threading.SynchronizationLockException | IllegalMonitorStateException |
| System.Threading.ThreadStateException | IllegalThreadStateException |
| System.NotSupportedException | InternalError |
| System.Threading.ThreadInterruptedException | InterruptedException |
| System.EntryPointNotFoundException | UnsatisfiedLinkError |
| System.TypeLoadException | NoClassDefFoundError |
| System.NullReferenceException | NullPointerException |
| System.FormatException | NumberFormatException |
| System.OutOfMemoryException | OutOfMemoryError |
| System.Security.SecurityException | SecurityException |
| System.StackOverflowException | StackOverflowError |
| System.Threading.ThreadStopException | Depends upon execution time. |
| System.Security.VerifierException | VerifyError |
| System.ExecutionEngineException | VirtualMachineError |
| System.SystemException | RuntimeException |

"public static long Float.\_convLong(float f)". The method Double.\_convLong comprises, for example, the following code:

```
Public static long_convLong(double d)
{
    if (d != d) // check for NAN.
        return 0;
    if (d >= Long.MAX_VALUE)
        return Long.MAX_VALUE;
    if (d <= Long.MIN_VALUE)
        return Long.MIN_VALUE;
    return (long)d;
}
```

Thus, according to this exemplary converter for handling type characteristics, four unspecified public methods take the place of IL code instructions. The overhead does not cause any significant impact because it would exist even if the .NET™ framework returned the JAVA™ language framework expected value.

Supporting Reflection Transparency

An exemplary converter optionally allows for "reflection transparency" such that reflection methods are not seen in a call stack or stack trace. In the .NET™ framework, an execution stack keeps track of all the methods that are in execution at a given instant. A trace of the method calls is known as a call stack or stack trace wherein the most recent method call appears first.

In the JAVA™ language framework, some reflection methods are transparent. In some transparent methods control goes over to a user code wherein, once under user code control, a user may reflect upon the call stack. These methods include: java.lang.Class.newInstance( ), which creates a new instance of a class; java.lang.reflect.Constructor.newInstance( ), which creates and initializes a new instance of the constructor's declaring class with specified initialization parameters; and java.lang.reflect.Method.invoke( ), which invokes the underlying method represented by the Method object, on the specified object with the specified parameters. To preserve functional characteristics of the JAVA™ language framework, upon conversion of JAVA™ language code to another framework, calls to these methods should not appear in a call stack.

In the .NET™ framework, the "StackTrace" class provides reflection capabilities for examining a call stack. However, without adequate conversion, "transparent" methods in a JAVA™ language code will normally appear in the .NET™ call stack. For example, consider the following code and corresponding stacks (e.g., resulting from reflection upon the call stack within the method that is invoked):

```
public void meth1(Method method, Object[ ] params) {
    int i = Method.invoke(params);
}
```

An expected JAVA™ language framework-like stack would appear as follows:

```
InvokeMethod
meth 1
The callers of meth1
```

In contrast, a .NET™ framework stack would appear as follows:

```
InvokeMethod
Method.invoke
meth 1
The callers of meth1
```

Note that for the expected JAVA™ language framework-like stack, the code call to Method.invoke is transparent whereas it appears in the .NET™ framework stack.

To account for such differences, an exemplary conversion method including class library implementation for handling reflection transparency checks for particular methods and renders them transparent before returning the stack. In yet another exemplary method, a converter introduces code that performs checks and/or deletions of stack entries. For example, an exemplary converter may introduce code that deletes "transparent" entries before returning a stack trace. In general, as discussed throughout, a converter and/or a conversion process may convert code, delete code and/or add code.

Supporting Scope

An exemplary converter handles scope or visibility differences between frameworks. In a given framework, "scoping" normally refer to setting variable or method visibility, for example, within an order of increasing visibility, e.g., local, private, package, protected, and public. In the JAVA™ language framework, class variables have four possible levels of visibility: private, default (also known as "package"), protected, and public.

A programmer typically uses scoping when a source file gets too large. For example, a programmer can split a single file into individual files and then declare the individual files as belonging to a package wherein the individual files share variables and essentially behave as a single source file. However, in the JAVA™ language framework, a programmer cannot explicitly declare default or "package" accessibility for variables and/or methods. At the default level, class members within a package can see the "default" variable, but classes outside the package that inherit from that class cannot. The JAVA™ language framework's protected accessibility attribute offers slightly more visibility. A protected variable or method is visible to inheriting classes, even not part of the same package. This is the only difference between the JAVA™ language framework's protected scope and default (package) scope declarations.

The .NET™ framework has scoping similarities and differences when compared to the JAVA™ language framework. Public and private declarations behave similarly in both JAVA™ language and .NET™ frameworks; however, package and protected do not. In the JAVA™ language framework, package (default) scope allows access within the same package. A package is the equivalent of namespace in the .NET™ framework. Protected allows access within the same family or the same package. Both protected and package scope have no direct equivalent in the .NET™ framework.

To account for differences between frameworks, an exemplary converter includes a process that marks package and protected as public and sets a custom attribute to mark the original JAVA™ language code's scope. According to this converter, the .NET™ compiler validates the code using these attributes for validations against persisted classes. In addition, JAVA™ language reflection APIs also validate using these custom attributes and do not allow illegal access. However, a programmer should note that use of this converter results in package and protected scoped members being potentially exposed as public to other languages or some other compiler.

In an alternative converter for handling scoping, the converter marks package scope in JAVA™ language as Assembly in the .NET™ framework and protected scope in JAVA™ language as FamilyOrAssembly in .NET™ framework. Custom attributes are set in this case also and the compiler validates against these attributes rather than the visibility attributes set in metadata. However, according to this converter, if a package were split across assemblies, the access of a package-scoped member across assemblies would fail at runtime because the members are marked as assembly scoped.

Yet another converter for handling scoping combines the two aforementioned exemplary converters. For example, the first described converter for handling scoping is set as a default option with availability of the second described converter for handling scoping as an extra option (e.g., /ss or /securescoping). Sources built using the first converter or the second converter can be mixed without any problem. Thus, the user may choose whether to expose protected/package scoped members as public or the user may choose the "/ss" option to do more secure scoping but to prevent possible runtime failures, all classes belong to a package are optionally compiled into a single assembly.

Supporting More Than One Difference

The aforementioned converters for converting code from one framework to code for another framework include features for supporting differences in object hierarchy, exceptions, type characteristics, reflection transparency, and/or scoping.

Figure 11:
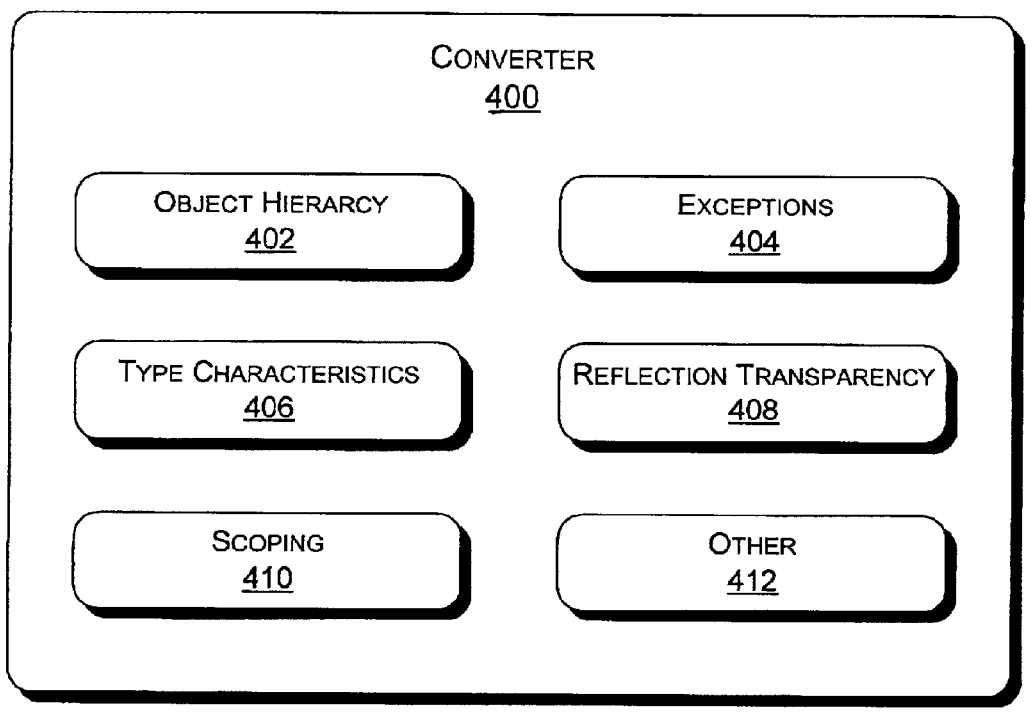
FIG. 11 is a block diagram illustrating an exemplary converter including features for supporting differences in object hierarchy, exceptions, type characteristics, reflection transparency, and scoping.

FIG. 11 shows a block diagram of the exemplary converter 400 (see, e.g., FIGS. 2 and 3) that optionally includes features for supporting differences in at least one of the following: object hierarchy 402, exceptions 404, type characteristics 406, reflection transparency 408, and scoping 410. A block labeled "other" 412 also appears within the converter block 400 to account for other differences. These individual blocks represent converter features and/or conversion processes as described herein and equivalents thereof. In one exemplary converter, a user and/or a processor select features as needed or as desired. For example, a user may select only the object hierarchy feature 402 of converter 400 or alternatively use a converter that only has a feature for supporting object hierarchy differences.

In essence, for a given application, some features may have greater importance than others. In particular, if a JAVA™ language code uses arrays and the user seeks to convert the code for use on the .NET™ framework, then the converter should have at least the array handling capability of the object hierarchy feature 402. Further, if debugging is important, then a user may select the exceptions feature 404.

Conversion Paths

To enhance portability of programming languages and processed codes, various exemplary converters optionally perform the following acts: (i) compile a programming language code associated with a first framework (e.g., a bytecode framework) to a compiled code associated with a second framework (e.g., an IL code framework); and/or (ii) convert a compiled code associated with a first framework (e.g., a bytecode framework) to a compiled code associated with a second framework (e.g., an IL code framework). The associated conversion methods and/or converters typically account for differences in object hierarchy and perform without substantially compromising the original programmer's intent.

Referring again to FIG. 3, two exemplary converter blocks 400, 430 optionally perform aforementioned acts. In FIG. 3, converter block 430 compiles a programming language code associated with a bytecode 204 to an IL code 312 is (e.g., JAVA™ programming language to MSIL) and converter block 400 converts a bytecode 212 to an IL code 312 (e.g., JAVA™ language bytecode to MSIL). The foregoing description of converters for converting a compiled code associated with a first framework (e.g., bytecode framework) to a compiled code associated with a second framework (e.g., an IL code framework) applies to converters for compiling a programming language code associated with a first framework (e.g., a bytecode framework) to a compiled code associated with a second framework (e.g., an IL code framework). In particular, the converters optionally include features for supporting differences in object hierarchy, exceptions, type characteristics, reflection transparency, and/or scoping. Thus, the features shown in FIG. 11 for the converter block 400 apply to converter block 430 shown in FIG. 3 and optionally to the converter block 460 shown in FIG. 7.

While various exemplary converters and methods described herein apply to converting from a JAVA™ language framework to a .NET™ framework, conversions from a .NET™ framework to a JAVA™ language framework are also within the scope of converters and methods presented herein as well as conversions to, from and/or between other frameworks known in the art.

Thus, although some exemplary methods and converters have been illustrated in the accompanying Drawings and described in the foregoing Detailed Description, it will be understood that the methods and converters are not limited to the exemplary embodiments disclosed, but are capable of numerous rearrangements, modifications and substitutions without departing from the spirit set forth and defined by the following claims.

What is claimed is:

1. A method executing on a computer-readable medium comprising:
    receiving an initial code associated with a bytecode framework, the bytecode framework having an object hierarchy; and
    converting the initial code to a converted code that combines the object hierarchy of the bytecode framework with an object hierarchy of an intermediate language code framework.

2. The method of claim 1 wherein the converting produces a class that inherits from a class of the bytecode framework.

3. The method of claim 2 wherein the class of the bytecode framework comprises a superclass of the bytecode framework.

4. The method of claim 2 wherein the class of the bytecode framework comprises a superclass named java.lang.Object.

5. The method of claim 2 wherein the class of the intermediate language code framework comprises an array class.

6. The method of claim 2 wherein the class of the intermediate language code framework comprises an array class named System.Array.

7. The method of claim 1 wherein the converting includes creating a new class.

8. The method of claim 7 wherein the new class inherits from java.lang.Object and from System.Array.

9. A computer-readable medium storing computer-executable instructions to convert an initial code associated with a bytecode framework, the bytecode framework having an object hierarchy, to a converted code that combines the object hierarchy of the bytecode framework with an object hierarchy of an intermediate language code framework.

10. A method executing on a computer-readable medium comprising:
    receiving an initial code associated with a bytecode framework, the bytecode framework having an exception hierarchy; and converting the initial code to a converted code that combines the exception hierarchy of the bytecode framework with an exception hierarchy of an intermediate language code framework.

11. The method of claim 10 wherein the converting includes mapping exceptions.

12. A computer-readable medium storing computer-executable instructions to convert an initial code associated with a bytecode framework, the bytecode framework having an exception hierarchy, to a converted code that combines the exception hierarchy of the bytecode framework with an exception hierarchy of an intermediate language code framework.

13. A method executing on a computer-readable medium comprising:
receiving an initial code associated with a bytecode framework, the bytecode framework having an exception hierarchy; and
converting the initial code to a converted code that maps the exception hierarchy of the bytecode framework to an exception hierarchy of an intermediate language code framework.

14. The method of claim 13 wherein the converting includes combining exception hierarchies.

15. A computer-readable medium storing computer-executable instructions to convert an initial code associated with a bytecode framework, the bytecode framework having an exception hierarchy, to a converted code that maps the exception hierarchy of the bytecode framework with an exception hierarchy of an intermediate language code framework.

16. A method executing on a computer-readable medium comprising:
receiving an initial code associated with a bytecode framework, the bytecode framework having reflection transparency; and
converting the initial code to a converted code that supports the reflection transparency of the bytecode framework on an intermediate language code framework.

17. The method of claim 16 wherein the converting includes checking for methods associated with the reflection transparency of the bytecode framework.

18. The method of claim 16 wherein the converting includes rendering a stack entry transparent.

19. A computer-readable medium storing computer-executable instructions to convert an initial code associated with a bytecode framework, the bytecode framework having reflection transparency, to a converted code that supports the reflection transparency of the bytecode framework on an intermediate language code framework.

20. A method executing on a computer-readable medium comprising:
receiving an initial code associated with a bytecode framework, the bytecode framework having scoping, and
converting the initial code to a converted code that supports the scoping of the bytecode framework on an intermediate language code framework.

21. The method of claim 20 wherein the converting includes marking a package scope and a protected scope associated with the bytecode framework as a public scope on the intermediate language code framework.

22. The method of claim 20 wherein the converting includes marking a package scope associated with the bytecode framework as an assembly on the intermediate language code framework.

23. The method of claim 20 wherein the converting includes marking a protected scope associated with the bytecode framework as an assembly or a family on the intermediate language code framework.

24. The method of claim 20 wherein the converting includes marking, the marking selected from a member of the group consisting of marking a protected scope associated with the bytecode framework as an assembly or a family on the intermediate language code framework; marking a package scope associated with the bytecode framework as an assembly on the intermediate language code framework; marking a package scope and a protected scope associated with the bytecode framework as a public scope on the intermediate language code framework; and combinations thereof.

25. A computer-readable medium storing computer-executable instructions to convert an initial code associated with a bytecode framework, the bytecode framework having scoping to a converted code that supports the scoping of the bytecode framework on an intermediate language code framework.

26. A method executing on a computer-readable medium comprising;
receiving an initial code associated with a bytecode framework, the bytecode framework having type characteristics; and
converting the initial code to a converted code that supports the type characterisitics of the bytecode framework on an intermediate language code framework.

27. The method of claim 26 wherein the converting supports type characteristics of the bytecode framework related to casting between real and integer types on the intermediate language code framework.

28. The method of claim 26 wherein the converting supports type characteristics of the bytecode framework related to overflow and undefined types on the intermediate language code framework.

29. A computer-readable medium storing computer-executable instructions to convert an initial code associated with a bytecode framework, the bytecode framework having type characteristics, to a converted code that supports the type characteristics of the bytecode framework on an intermediate language code framework.

30. A method executing on a computer-readable medium comprising:
receiving an initial code associated with a bytecode framework, the bytecode framework having at least one member selected from the group consisting of object hierarchies, exception hierarchies, type characteristics, reflection transparencies, and scoping; and
converting the initial code to a converted code that supports at least one of the selected members on an intermediate language code framework.

31. A computer-readable medium storing computer-executable instructions to convert an initial code associated with a bytecode framework, the bytecode framework having at least one member selected from the group consisting of object hierarchies, exception hierarchies, type characteristics, reflection transparencies, and scoping, to a converted code that supports at least one of the selected members of the bytecode framework on an intermediate language code framework.

* * * * *

UNITED STATES PATENT AND TRADEMARK OFFICE
CERTIFICATE OF CORRECTION

PATENT NO.         : 6,961,932 B2
APPLICATION NO. : 09/931649
DATED                   : November 1, 2005
INVENTOR(S)         : Debi Mishra et al.

It is certified that error appears in the above-identified patent and that said Letters Patent is hereby corrected as shown below:

In column 6, line 51, delete "java.langObject" and insert -- java.lang.Object --, therefor.

In column 7, line 17, delete "ajava.lang.Object" and insert -- a java.lang.Object --, therefor.

In column 8, line 15, delete "java lang.Object" and insert -- java.lang.Object --, therefor.

In column 8, line 55, delete "java.lang.Object [ ]" and insert -- java.lang.Object[ ] --, therefor.

In column 9, line 30, delete "instance of" and insert -- instanceof --, therefor.

In column 10, line 22, delete "java lang.Object" and insert -- java.lang.Object --, therefor.

In column 10, line 62, delete "java lang.Object" and insert -- java.lang.Object --, therefor.

In column 11, line 5, delete "java lang.Object" and insert -- java.lang.Object --, therefor.

In column 11, line 61, delete "java.lang.RuntimeExccption" and insert -- java.lang.RuntimeException --, therefor.

In column 13, line 50, delete "catch (MyException e)" and insert -- catch(MyException e) --, therefor.

In column 14, line 47, delete "Try code { }" and insert -- try code{} --, therefor.

In column 14, line 48, delete "catch (MyExeception e)" and insert -- catch(MyExeception e) --, therefor.

In column 14, line 49, delete "catch code {}" and insert -- catch code{} --, therefor.

In column 15, line 12, delete "System.SyetemException" and insert -- System.Exception --, therefor.

In column 16, line 5, delete "BASICS®" and insert -- BASIC® --, therefor.

UNITED STATES PATENT AND TRADEMARK OFFICE
CERTIFICATE OF CORRECTION

PATENT NO. : 6,961,932 B2
APPLICATION NO. : 09/931649
DATED : November 1, 2005
INVENTOR(S) : Debi Mishra et al.

It is certified that error appears in the above-identified patent and that said Letters Patent is hereby corrected as shown below:

In column 17, line 14, delete ".NET™" and insert -- .NET --, therefor.

In column 17, line 20, delete ".NET™" and insert -- .NET --, therefor.

In column 18, line 18, after "original" delete "it".

In column 19, line 64, delete "meth 1" and insert -- meth1 --, therefor.

In column 20, line 8, delete "meth 1" and insert -- meth1 --, therefor.

In column 21, line 67, delete "is" before "(e.g.,".

In column 23, line 55, in Claim 20, after "scoping" delete "," and insert -- ; --, therefor.

In column 24, line 20, in Claim 25, insert -- , -- before "to".

In column 24, line 24, in Claim 26, after "comprising" delete ";" and insert -- : --, therefor.

In column 24, line 30, in Claim 26, delete "characterisitics" and insert -- characteristics --, therefor.

Signed and Sealed this

Fourth Day of August, 2009

JOHN DOLL
*Acting Director of the United States Patent and Trademark Office*